United States Patent [19]
Saints

[11] Patent Number: 5,903,554
[45] Date of Patent: May 11, 1999

[54] METHOD AND APPARATUS FOR MEASURING LINK QUALITY IN A SPREAD SPECTRUM COMMUNICATION SYSTEM

[75] Inventor: Keith W. Saints, San Diego, Calif.

[73] Assignee: Qualcomm Incorporation, San Diego, Calif.

[21] Appl. No.: 08/722,763

[22] Filed: Sep. 27, 1996

[51] Int. Cl.$^6$ .............................. H04B 7/216; H04B 17/00
[52] U.S. Cl. ........................ 370/342; 370/335; 375/346; 455/67.3; 455/226.3
[58] Field of Search ..................................... 370/335, 342, 370/441, 320; 375/200, 206, 346; 455/522, 67.1, 67.3, 226.1, 226.2, 226.3

[56] References Cited

U.S. PATENT DOCUMENTS

| | | | |
|---|---|---|---|
| 5,245,629 | 9/1993 | Hall ............................................... | 375/1 |
| 5,396,516 | 3/1995 | Padovani et al. ....................... | 375/225 |
| 5,416,797 | 5/1995 | Gilhousen et al. ..................... | 375/705 |
| 5,548,808 | 8/1996 | Bruckert et al. ........................ | 370/332 |
| 5,559,790 | 9/1996 | Yano et al. ................................ | 370/18 |
| 5,577,025 | 11/1996 | Skinner et al. ......................... | 375/200 |
| 5,603,096 | 2/1997 | Gilhousen et al. ..................... | 455/522 |
| 5,721,754 | 2/1998 | Chen ....................................... | 370/334 |

FOREIGN PATENT DOCUMENTS 9604718  2/1996  WIPO .

*Primary Examiner*—Chi H. Pham
*Assistant Examiner*—Steven Nguyen
*Attorney, Agent, or Firm*—Russell B. Miller; Bruce W. Greenhaus; Kent D. Baker

[57] ABSTRACT

The present invention is a method and apparatus for providing a received signal quality metric which is optimally designed to control the transmission power of a transmitter in a closed loop power control system. The present invention is described in the context of a spread spectrum communication system but it is equally applicable to other types of communication systems. In the present invention, the power control system is described for controlling the power of transmissions from a base station to a mobile station, referred to as forward link transmissions.

8 Claims, 4 Drawing Sheets

5,903,554

METHOD AND APPARATUS FOR MEASURING LINK QUALITY IN A SPREAD SPECTRUM COMMUNICATION SYSTEM

BACKGROUND OF THE INVENTION

I. Field of the Invention

The present invention relates to communications. More particularly, the present invention relates to a novel and improved method and apparatus for controlling the transmission power of a remote station in a wireless communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and is incorporated by reference herein.

In a useful method of controlling transmission power of a mobile station in a communication system, the mobile station counts frames which are received in error. If a threshold is exceeded, the mobile station sends a message to the base station. The count is periodically reset. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR TELEPHONE SYSTEM", assigned to the assignee of the present invention and incorporated by reference herein.

A method for providing faster power control is described in copending U.S patent application Ser. No. 08/374,444, filed Mar. 29, 1996, entitled "METHOD AND APPARATUS FOR THE FORMATTING OF DATA FOR TRANSMISSION", now U.S. Pat. No. 5,568,483 assigned to the assignee of the present invention and incorporated by reference herein. In this method, the mobile station sends a bit every Reverse Traffic Channel frame indicating the quality of the previous Forward Traffic Channel frame. The bit is a '0' if the frame were received without error; the bit is a '1' if the frame was received in error. Since these bits are encoded and interleaved, they are received error free. Due to the frame quality indicator on every frame, the mobile station will be able to discard power control bits which are likely to be in error.

These methods of providing power control, however, are limited to feeding back at most one significant bit of information per frame of data received. The fading conditions may require significantly faster feedback of information.

SUMMARY OF THE INVENTION

The present invention is a novel and improved method for providing a received signal quality metric which is optimally designed to control the transmission power of a transmitter in a closed loop power control system. The present invention is described in the context of a spread spectrum communication system but it is equally applicable to other types of communication systems. In the present invention, the power control system is described for controlling the power of transmissions from a base station to a mobile station, referred to as forward link transmissions. The present invention is equally applicable to controlling the power of reverse link transmissions, transmissions from the mobile station to the base station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
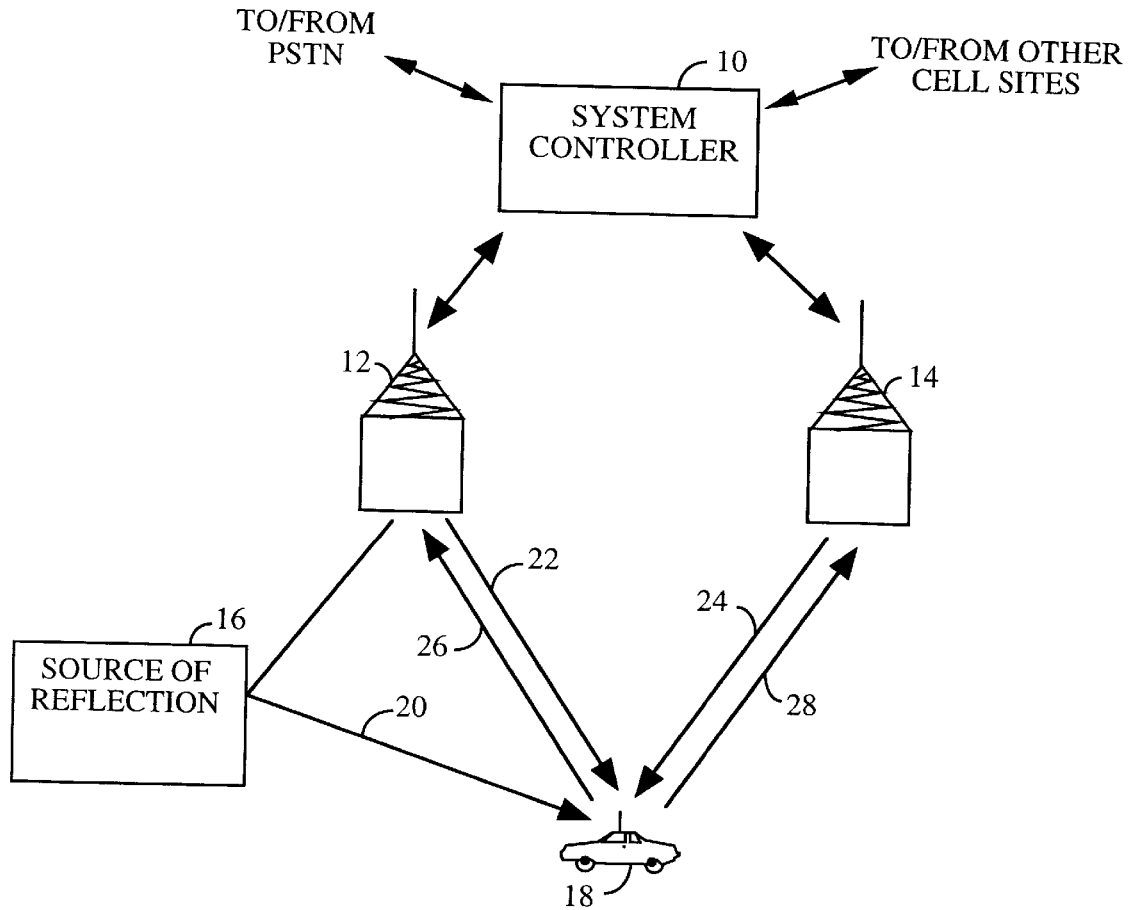
FIG. 1 is an illustration of the present invention in a typical mobile telephone environment.

Referring to FIG. 1, system controller 10 receives data from and provides data to public switch telephone network (PSTN) (not shown) and to other base stations (not shown). Base stations 12 and 14 receive data from and provide data to system controller 10. Base station 12 transmits data to mobile station 18, referred to as forward link transmissions, on signal paths 20 and 22. Signal path 22 is a straight path from base station 12 to mobile station 18. Signal path 20 is a reflected signal path, with the signal transmitted by base station 12 being reflected off of reflection source 16. Although illustrated as a block in FIG. 1, reflection source 16 is actually an artifact of the environment in which mobile station 18 is operating, it would typically be a building or other structure.

In the exemplary embodiment, mobile station 18 will demodulate the signals received on paths 20 and 22 separately and combine the demodulated signals. The design and implementation of receivers capable of combining signals received on different propagation paths is described in detail in the aforementioned U.S. Pat. No. 5,109,390.

In addition, base station 14 is transmitting data on path 24, which may be intended or not for reception by mobile station 18. If mobile station 18 is near a cell boundary between cells being served by base stations 12 and 14, mobile station 18 may be placed in soft handoff in which base stations 12 and 14 are redundantly transmitting the data to mobile station 18. In this case the signals will be separately demodulated and combined. The method of soft handoff is described in detail in the aforementioned U.S. Pat. No. 5,101,501. If the signals transmitted by base station 14 are not intended for reception by mobile station 18, then, in the exemplary embodiment, the signal will appear as in band noise to mobile station 18.

The quality of the transmissions to mobile station 18 is determined by the strengths of the signals provided on paths 20 and 22, and the signal provided on path 24 if mobile station 18 is in soft handoff. Based on the quality of the transmissions, mobile station 18 transmits a signal back to base station 12 on signal path 26 indicating the quality of the signals received. If mobile station 18 is in soft handoff this signal will also be received by base station 14.

In the exemplary embodiment, data is transmitted in 20 ms frames and indications of the quality of received frames are sent 16 times for each received frame or once every 1.25 ms. The present invention is equally applicable to continuous transmission systems and systems using different frame lengths and rates for providing the signal quality indication.

The optimal measure of signal quality for controlling the transmit power of a remote base station is the signal to noise ratio on the traffic channel (Traffic $E_b/Nt$). In the exemplary embodiment, the signal quality measurement system measures the per finger values of (Traffic $Eb(f)/Nt(f)$) and then generates a overall (Traffic $E_b/Nt$), in accordance with the combining weights of the diversity receiver as described by equation (1) below.

$$\text{Traffic } Eb/Nt = \frac{\left(\sum_{f=1}^{N} \omega_f \cdot \sqrt{Eb(f)}\right)^2}{\sum_{f=1}^{N} \omega_f^2 \cdot Nt(f)}, \tag{1}$$

where $\omega f$ is the weighting factor used by the diversity receiver to combine the demodulated fingers so as to provide an improved estimate of the transmitted data, $Eb(f)$ is energy of a bit of traffic data on finger (f) and $Nt(f)$ is the interference experienced by the signal on finger (f).

When optimal combining occurs, the overall traffic $Eb/Nt$ is the sum of the per finger values of $Eb(f)/Nt(f)$. Therefore an alternative method is to simply add up the per finger values to derive the overall traffic $Eb/Nt$.

$Nt(f)$ includes thermal noise, interference from other cells, and interference from other paths of signals from the same cell.

If the present invention is determining the quality of the received finger of signal path 22 transmitted from base station 12 to mobile station 18, then $Nt(f)$ would include the interference caused by transmissions from base station 14 on signal path 24 and multipath interference by signal path 20.

In the exemplary embodiment of the present invention, the interference to the traffic channel signal on finger (f) is calculated by measuring the total in band energy and subtracting out the non-interfering energy provided on the same path in accordance with equation (3) below.

$$Nt(f)=Io-\hat{I}or(f), \tag{3}$$

where Io is the total energy received within the frequency band and $\hat{I}or(f)$ is the total power of the signal that originated from base station 14 (including transmissions to other users) on a single path on which finger (f) is locked. Because in CDMA the signals transmitted on a single path are orthogonal to one another the value $\hat{I}or(f)$ is a measure of the non-interfering power which does not contribute to the degradation of the received signal.

Pilot Fraction Method

Figure 3:
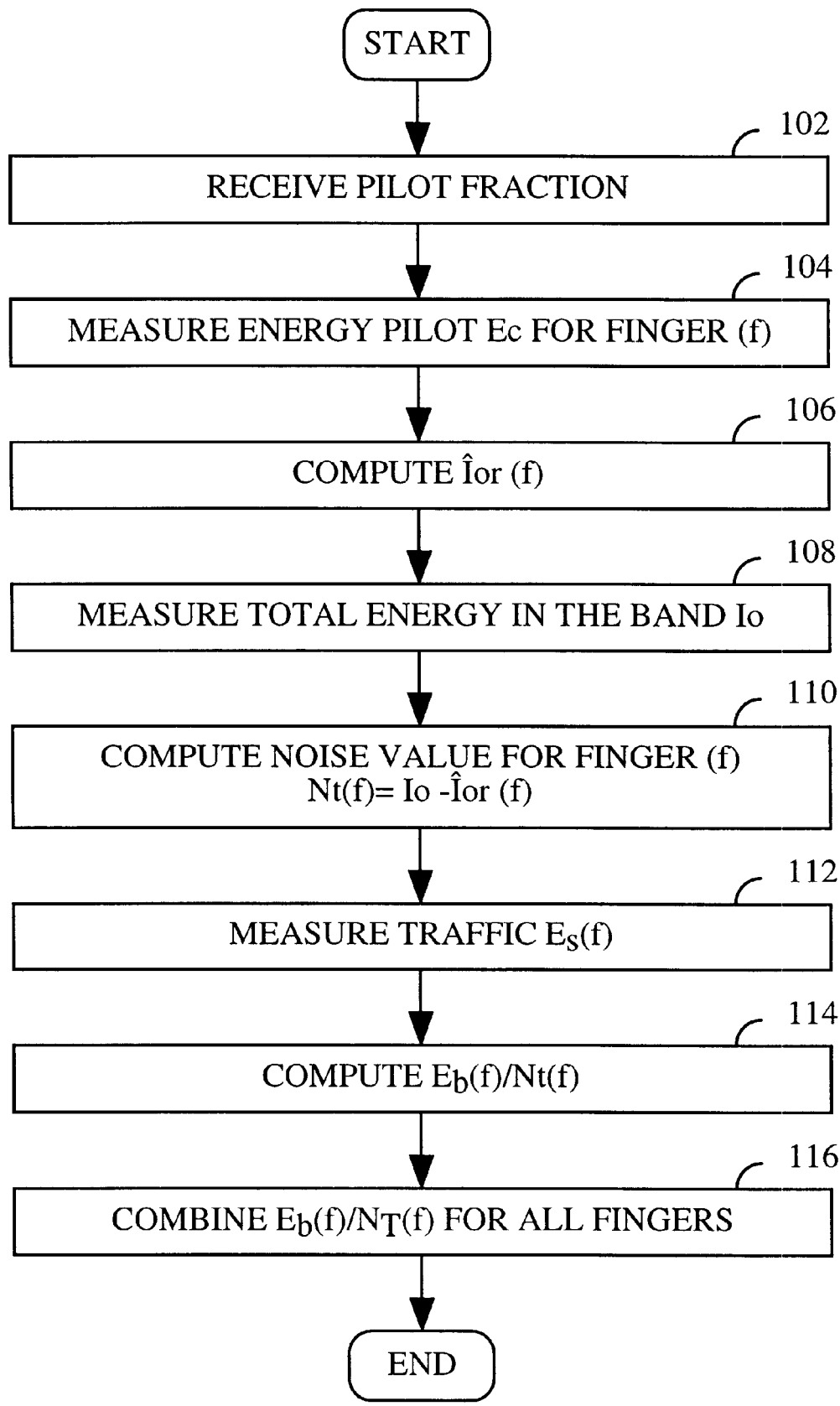
FIG. 3 is a flowchart illustrating the first embodiment for determining a quality metric in the present invention.
Figure 4:
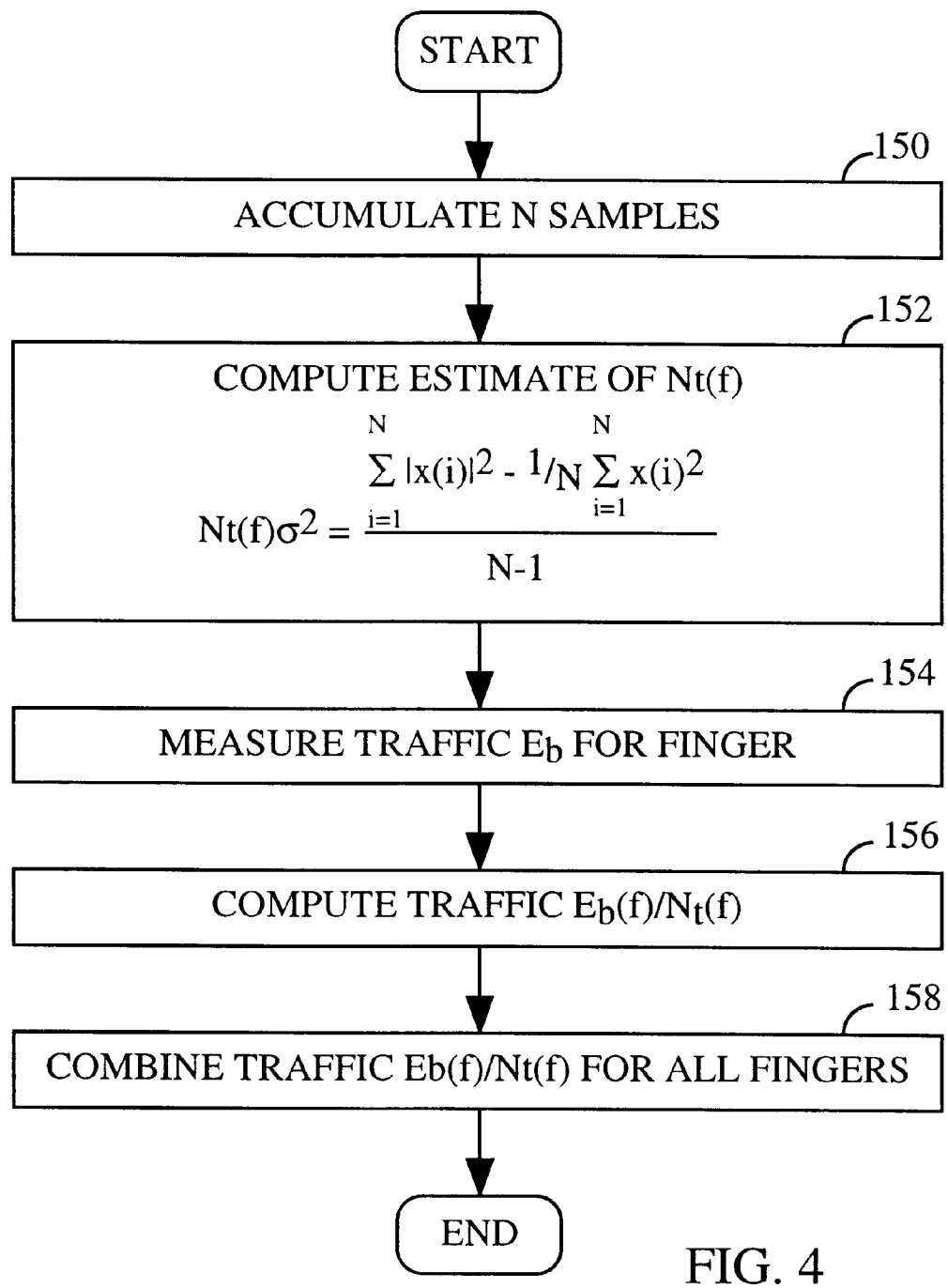
FIG. 4 is a flowchart illustrating the second embodiment for determining a quality metric in the present invention.

The first exemplary embodiment for generating a quality metric, referred to herein as the pilot fraction method, is illustrated by the flow diagram of FIG. 3. In the first exemplary embodiment, the quality measure will be described in the context of measuring the quality of the signal provided on path 22. To provide the ultimate power control feedback similar operations will be performed to estimate the signal to noise ratio of the signals received on paths 20 and 24 which are then combined in accordance with equation (1) above.

In the first exemplary embodiment of the present invention, base station 12 transmits, via signaling data, an indication of the fraction of the total energy of the signal transmitted by base station 12 that is used to transmit the pilot signal. This value is given by equation (4) below:

$$\text{Pilot Fraction} = \frac{\text{Pilot } Ec}{Ior}. \tag{4}$$

Pilot Ec is the energy in a "chip" transmitted by base station 12, where the duration of a chip is inversely proportional to the spreading rate and Ior is the total energy of the signal normalized by the receive band bandwidth transmitted by base station 12. Thus, Pilot Fraction is unitless.

Figure 2:
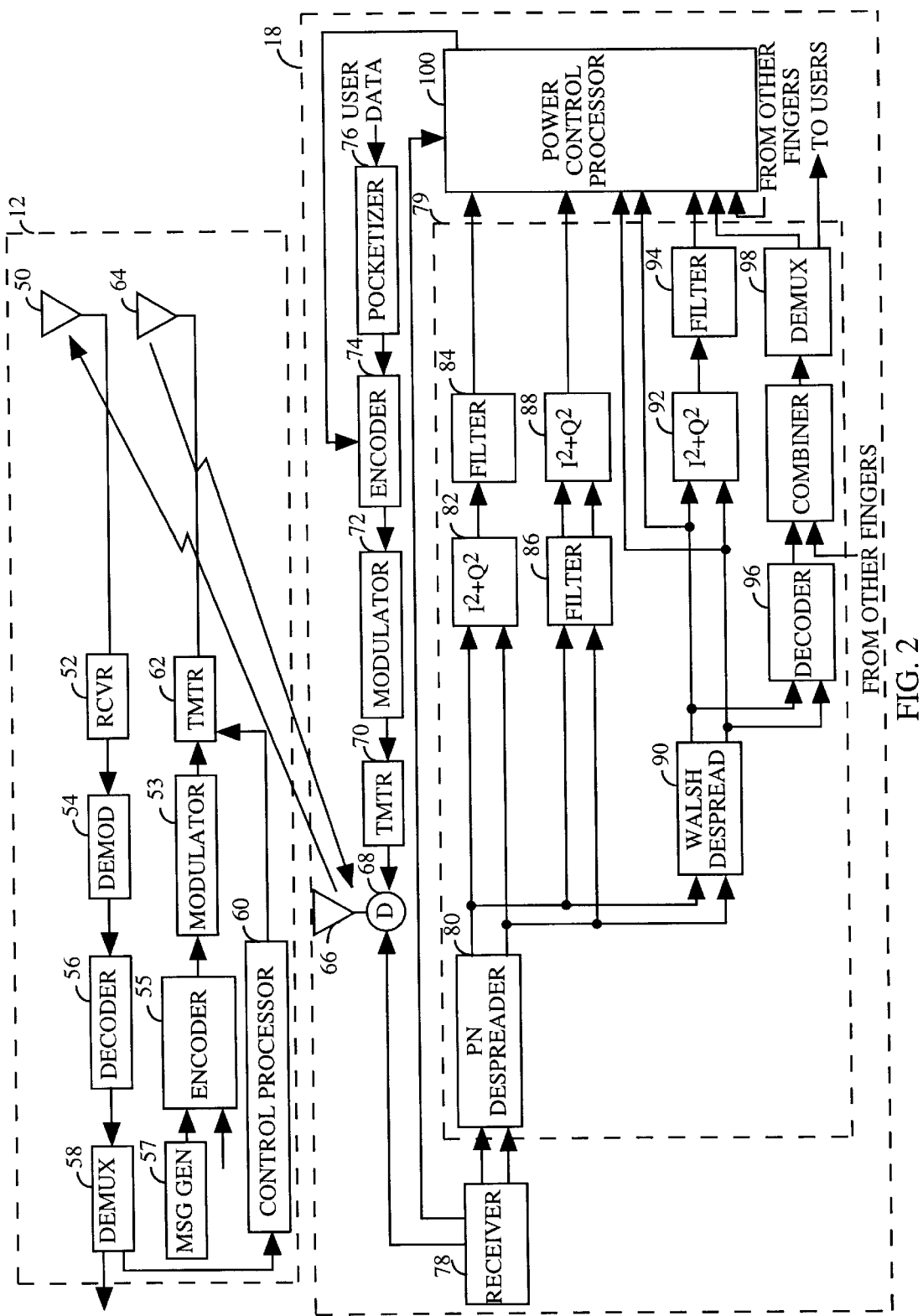
FIG. 2 is a block diagram of the power control system of the present invention.

Referring to FIG. 2, the pilot fraction signal is generated by message generator (MSG GEN) 57. In the exemplary embodiment, the pilot fraction message is provided to encoder 55 and combined with forward link traffic data. In an alternative embodiment, the pilot fraction message is provided separately as signaling data on the traffic channel or on a separate signaling channel such as the sync channel. Encoder 55 combines the pilot fraction message with forward link data. The encoded symbols are then provided to modulator 53 which modulates the data for transmission. In the exemplary embodiment, modulator 53 is a code division multiple access (CDMA) modulator as described in detail in the aforementioned U.S. Pat. Nos. 4,901,307 and 5,103,459. In the exemplary embodiment, the pilot fraction message is modulated onto the traffic channel. It is envisioned, however, that because this value is the same regardless of the mobile station to which communications are being transmitted that the information could be provided on a common channel that is being monitored by all mobile stations in communication with base station 18.

The modulated signal is provided to transmitter (TMTR) 62 which upconverts and amplifies the signal which is transmitted through antenna 64.

The transmitted signal is received by mobile station 18 (block 102 of FIG. 3) by antenna 66 and provided through duplexer 68 to receiver (RCVR) 78. Receiver 78 downconverts, amplifies and filters the received signal and provides that signal to pseudorandom noise despreader (PN DESPREAD) 80. Despreader 80 despreads the received signal in accordance with a pseudorandom code as is described in detail in the aforementioned U.S. Pat. Nos. 4,901,307 and 5,103,459. The PN despread signal is provided to despreader (WALSH DESPREAD) 90 which despreads the signal in accordance with the allocated traffic channel Walsh sequence as is described in detail in the aforementioned U.S. Pat. Nos. 4,901,307 and 5,103,459.

The Walsh despread signal is provided to decoder 96, which decodes the signal and provides the decoded signal to demultiplexer (DE-MUX) 98 which separates the Pilot Fraction message from the forward link traffic data. The Pilot Fraction message is provided to power control processor 100. Power control processor 100 can be implemented using a microprocessor or microcontroller programmed to perform the functions described herein. The remaining traffic data is provided to the user of mobile station 18.

The next step in the process (block 104) is for mobile station 18 to measure the energy of a received pilot chip. The pilot signal transmitted by base station 12 is received by antenna 66 of mobile station 18 and provided through duplexer 68 to receiver 78. Receiver 78 downconverts and amplifies the received signal and provides it to PN despreader 80. In the exemplary embodiment, the received signal is a quadrature phase shift keyed (QPSK) signal with I and Q components. It should be noted that the present invention is equally applicable to other signal transformations, such as binary phase shift keyed (BPSK) modulation.

The despread pilot signal is provided to filter 86 which removes noise from the pilot symbols. The filtered symbols are provided to squaring means ($I^2+Q^2$) 88 which squares and sums the despread signal amplitude of the pilot signal on the I channel and Q channels. The squared values provide an estimate of the energy of a chip on the pilot channel (Pilot Ec) to power control processor 100.

Power control processor 100 computes an estimate of the total amount of non-interfering energy ($\hat{I}or(f)$) arriving on finger (f) from equation (5) below.

$$\hat{I}or(f) = \text{Pilot Fraction}^{-1} \times \text{Pilot Ec}. \quad (5)$$

Receiver 78 (in block 108) measures and provides a signal indicative of the in band energy to control processor 100. It should be noted that because receiver 78 typically includes an automatic gain control (AGC) amplifier (not shown), the measurement of the in band energy is an artifact of the receivers operation.

In block 110, control processor 100 computes a value for the interference experienced by finger (f), denoted Nt(f), in accordance with equation (6) below.

$$Nt(f) = Io - \hat{I}or(f). \quad (6)$$

Pilot Scatter Method

In a second exemplary embodiment of the present invention, mobile station 18 is not provided with the pilot fraction, but rather estimates the non interfering noise ($N_t(f)$) by compiling information based on the energy of the variations in the energy of the received pilot signal.

In block 152, the estimated noise on finger (f) is computed by power control processor 100. In general, the estimate of Nt(f) is made by observing the stream of pilot symbols. One way of forming an estimate of Nt(f) is shown in FIG. 2 using squaring means 82 and 88 and filters 84 and 86. In the exemplary embodiment, filters 84 and 86 are simple averaging filters and Nt(f) is determined in accordance with equation (7) below:

$$Nt(f) = \frac{\sum_{i=1}^{N} [X_I^2(i) + X_Q^2(i)] - \frac{1}{N}\left(\sum_{i=1}^{N} X_I(i)\right)^2 - \frac{1}{N}\left(\sum_{i=1}^{N} X_Q(i)\right)^2}{N-1}, \quad (7)$$

where N is the number of samples accumulated to provide the statistics. In the exemplary embodiment, N is 24.

After having computed the noise on the traffic channel in block 112, mobile station 18 measures the symbol energy of the received traffic channel symbols. The PN despread signal from despreader 80 is provided to Walsh despreader 90, which despreads the received traffic channel signal in accordance with an allocated traffic channel Walsh sequence as is described in detail in the aforementioned U.S. Pat. Nos. 4,901,307 and 5,103,459.

The Walsh despread signal is then provided to squaring means 92. As stated above, in the exemplary embodiment the received signal is a QPSK signal though the present invention is equally applicable to other modulation techniques. Squaring means 92 squares and sums amplitudes of the Walsh despread I and Q components and provides the values to filter 94. Filter 94 removes noise from the traffic channel symbol energy estimate (Traffic $E_s$) and provides the filtered estimate to power control processor 100.

Power control processor 100 then converts the estimated traffic symbol energy value (Traffic $E_s$) to an estimated traffic bit energy value (Traffic $E_b$), in accordance with equation (8) below.

$$\text{Traffic } E_b = \text{Traffic } E_s \cdot \frac{R_s}{R_b}, \quad (8)$$

where $R_s$ is the symbol rate of the transmitted signal and $R_b$ is the bit rate of the transmitted signal. This computation poses an additional complexity in variable rate communication systems because mobile station 18 does not know apriori the bit rate ($R_b$) of the transmitted signal.

One possible solution to the variable rate problem is for power control processor 100 to estimate the bit rate Rb of the variable rate transmission. One possible method for estimating the bit rate of the transmission is for mobile station 18 to make an estimate of the rate of the current frame based on statistics and the history of received frames. An exemplary embodiment method is to assume the frame of the current frame is the same as the previous frame.

As described in Telecommunication Industry Association's Interim Standard *TIA/EIA IS-95-A Mobile Station-Base Station Compatibility Standard for Dual-Mode Wideband Spread Spectrum Cellular System*, the forward link transmission power varies proportionally to the rate. In a second exemplary embodiment, power control processor 100 estimates the rate of the signal from the received traffic symbol energy $E_s$. In an improved embodiment, power control processor 100 uses the relative traffic symbol energy (Traffic Es) to pilot chip energy (Pilot Ec) to estimate the rate, this prevents incorrect estimates of the rate caused by propagation path changes such as fading since the pilot energy fades at the same rate as the traffic channel.

Power control processor 100, in block 114, computes the value $E_b(f)/Nt(f)$ for the propagation path (f), and does likewise for the other propagation paths. The values for each finger are then weighted and summed by power control processor 100, in block 116.

In the exemplary embodiment, power control processor 100 compares the calculated value of $E_b/Nt$ against a threshold value and provides a single bit of information indicating whether the computed $E_b/Nt$ is above or below the threshold.

The user data is provided in frames to packetizer 76, which in the exemplary embodiment, generates and appends a set of cyclic redundancy check (CRC) bits and appends a set of tail bits as is described in detail in the aforementioned U.S. Pat. Nos. 4,901,307 and 5,414,796. The packetized user data is provided to encoder 74 which convolutionally encodes the packet. In the exemplary embodiment, the power control bit is encoded by encoder 74 and punctured into the encoded packet. In an alternative embodiment, the power control bit is punctured into the packet without being encoded. In a second alternative embodiment, the power control bit can be encoded with the packetized user data, but this may be undesirable because of the additional delay resulting from having to decode the entire packet before being able to recover the power control data. Additionally the power control bit could be transmitted on a signaling channel or on a dedicated power control channel.

The encoded packet which includes the power control bit is then provided to modulator 72 which modulates the data for transmission. In the exemplary embodiment, modulator 72 is a spread spectrum modulator as described in detail in the aforementioned U.S. Pat. Nos. 4,901,307 and 5,103,459. The modulated signal is provided to transmitter (TMTR) 70 which upconverts and amplifies the signal and transmits the signal through duplexer 68 and antenna 66.

The transmitted signal is received by antenna 50 of base station 12 and provided to receiver 52. Receiver 52 down converts and amplifies the signal and provides the signal to demodulator 54. In the exemplary embodiment, demodulator 54 demodulates the received signal in accordance with a spread spectrum format as described in detail in aforementioned U.S. Pat. Nos. 4,901,307 and 5,103,459. The demodulated frame is then provided to decoder 56, which in the exemplary embodiment separates the power control message from the traffic message and decodes the two messages separately. The decoded traffic message is provided to PSTN or other base stations as described previously.

The power control message is provided to control processor 60 which generates a command based on the power control message. The command is provided to transmitter (TMTR) 62, which adjusts the amplification of the outgoing signals in response to the command from control processor 60.

In an alternative embodiment, mobile station 18 sends more than one bit of information indicative of the computed value of $E_b/Nt$. The message could indicate a quantized value of the $E_b/Nt$. In a second alternative embodiment, mobile station 18 transmits a signal indicative of the calculated $E_s/Nt$, which has the benefit that mobile station 18 need not estimate the rate of the received packet. Base station 12 knows the rate of the frame transmitted and can determine whether the $E_b/Nt$ is sufficient in accordance with equation 8 above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a closed loop power control system in a CDMA communication system, a method for generating power control commands comprising the steps of:

measuring an inband energy value;

measuring a pilot channel energy;

scaling said pilot channel energy in accordance with a pilot fraction value to provide a non interfering energy value;

subtracting said non interfering energy value from said inband energy value to provide an interference noise value;

measuring a bit energy of a received signal;

computing a signal to noise ratio in accordance with said interference noise value and said bit energy; and generating a power control command in accordance with said signal to noise ratio.

2. The method of claim 1 further comprising the step of comparing said signal to noise ratio with a predetermined threshold value.

3. The method of claim 1 further comprising the step of receiving said pilot fraction value from a remote communications device.

4. The method of claim 1 wherein said step of measuring said bit energy comprises the steps of:

measuring a symbol energy value; and scaling said symbol energy value in accordance with a data rate value.

5. The method of claim 4 wherein said step of measuring said bit energy comprises the steps of determining said data rate value.

6. The method of claim 4 wherein said step of measuring said bit energy comprises the steps of receiving said data rate value from a remote communication device.

7. In a closed loop power control system in a CDMA communication system, a method for generating power control commands comprising the steps of:

accumulating a predetermined integer number (N) samples of a demodulated signal;

computing a noise value for said demodulated signal in accordance with said accumulated samples;

measuring a bit energy for said demodulated signal;

computing a signal to noise ratio for said demodulated signal in accordance with said noise value for said demodulated signal and said bit energy for said demodulated signal; and generating a power control command in accordance with said signal to noise ratio:

wherein said step of computing a noise value for said demodulated signal comprises the steps of:

summing the squares of symbol amplitudes of said accumulated symbols to provide a summed energy value:

summing the symbol amplitudes of said accumulated symbols:

squaring said sum of said symbol amplitudes;

dividing the square of said sum of said symbol amplitudes by N to provide a normalized square value; and subtracting said normalized square value from said summed energy value and dividing the result by (N-1) to provide said noise value.

8. The method of claim 7 further comprising the step of combining at least one additional signal to noise ratio for at least one additional demodulated signal.

* * * * *